US012780164B2

(12) United States Patent
Beedy et al.

(10) Patent No.: US 12,780,164 B2
(45) Date of Patent: Nov. 3, 2026

(54) CONTROLLING BRAKE BOOSTER COMMUNICATION WITH MULTIPLE BRAKE ASSEMBLIES

(71) Applicant: FCA US LLC, Auburn Hills, MI (US)

(72) Inventors: Joshua L Beedy, Auburn Hills, MI (US); Patrick L Frahm, Auburn Hills, MI (US); Cody L Nofzinger, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 68 days.

(21) Appl. No.: 18/886,093

(22) Filed: Sep. 16, 2024

(65) Prior Publication Data

US 2026/0077752 A1 Mar. 19, 2026

(51) Int. Cl.

*B60T 13/68* (2006.01)
*B60T 8/171* (2006.01)
*B60T 13/14* (2006.01)
*B60T 7/04* (2006.01)

(52) U.S. Cl.

CPC ............ *B60T 13/145* (2013.01); *B60T 8/171* (2013.01); *B60T 13/686* (2013.01); *B60T 7/042* (2013.01)

(58) Field of Classification Search

CPC ...... B60T 13/686; B60T 13/145; B60T 7/042; B60T 2270/403; B60T 8/171

See application file for complete search history.

(56) References Cited

U.S. PATENT DOCUMENTS 6,505,893 B2 * 1/2003 Schmidt ................ B60T 17/226 303/146
8,894,159 B2 * 11/2014 Nakata .................. B60T 17/221 303/191
12,427,964 B2 * 9/2025 Yang ....................... B60T 17/18

* cited by examiner

*Primary Examiner* — Gonzalo Laguarda

(74) *Attorney, Agent, or Firm* — Jeremy J. Klobucar

(57) ABSTRACT

A method for controlling an electro-hydraulic brake system includes the steps of determining an expected pressure of the brake system, determining the actual pressure of the brake system, and comparing the actual pressure to the expected pressure. If the actual pressure is less than the expected pressure by more than a threshold, a brake booster is isolated from a first brake assembly. A subsequent actual pressure is determined and compared to the expected pressure. If the subsequent actual pressure is less than the expected pressure by more than a threshold, a brake booster is isolated from a second brake assembly. A second subsequent actual pressure is determined and compared to the expected pressure. If the second subsequent actual pressure is less than the expected pressure by more than a threshold, a brake booster is isolated from both the first brake assembly and the second brake assembly.

20 Claims, 3 Drawing Sheets

CONTROLLING BRAKE BOOSTER COMMUNICATION WITH MULTIPLE BRAKE ASSEMBLIES

FIELD

The present disclosure relates to a method that controls an electro-hydraulic brake system for vehicles.

BACKGROUND

When a brake line, valve, or other brake fluid containing component leaks or fails, fluid pressure and braking force within at least a portion of the brake system may be decreased or completely lost. However, if the portion of the brake system that includes the leak is isolated from the rest of the brake system, the remaining, intact portion of the brake system can be used to provide braking force to the vehicle's wheels.

SUMMARY

In at least some implementations, a method for controlling an electro-hydraulic brake system includes the steps of determining an expected pressure in the brake system, determining an actual pressure in the brake system, and preventing communication between a brake booster and a first brake assembly and permitting communication between the brake booster and a second brake assembly when the actual pressure is less than the expected pressure by more than a threshold.

In at least some implementations, the method includes the steps of determining a subsequent actual pressure in the brake system, permitting communication between the brake booster and the first brake assembly, and preventing communication between the brake booster and the second brake assembly when the subsequent actual pressure is less than the expected pressure by more than a threshold.

In at least some implementations, the method includes the steps of determining a second subsequent actual pressure in the brake system, preventing communication between the brake booster and the first brake assembly, and preventing communication between the brake booster and a second brake assembly when the second subsequent actual pressure is less than the expected pressure by more than a threshold.

In at least some implementations, the first brake assembly is a right-front brake assembly and a left-front brake assembly, and the second brake assembly is a right-rear brake assembly and a left-rear brake assembly.

In at least some implementations, the method includes the steps of determining a subsequent actual pressure in the brake system, permitting communication between the brake booster and the right-front brake assembly and the left-front brake assembly, and preventing communication between the brake booster and the right-rear brake assembly and the left-rear brake assembly when the subsequent actual pressure is less than the expected pressure by more than a threshold.

In at least some implementations, the method includes the steps of determining a second subsequent actual pressure in the brake system, preventing communication between the brake booster and the right-front brake assembly, the left-front brake assembly, the right-rear brake assembly, and the left-rear brake assembly when the second subsequent actual pressure is less than the expected pressure by more than a threshold.

In at least some implementations, communication between the brake booster and the first brake assembly is prevented by closing a first brake booster valve or by leaving the first brake booster valve closed, and communication between the brake booster and the second brake assembly is permitted by opening a second brake booster valve or by leaving the second brake booster valve open.

In at least some implementations, communication between the brake booster and the first brake assembly is permitted by opening a first brake booster valve or by leaving the first brake booster valve open, and communication between the brake booster and the second brake assembly is prevented by closing a second brake booster valve or by leaving the second brake booster valve closed.

In at least some implementations, communication between the brake booster and the first brake assembly is prevented by closing a first brake booster valve or by leaving the first brake booster valve closed, and communication between the brake booster and the second brake assembly is prevented by closing a second brake booster valve or by leaving the second brake booster valve closed.

In at least some implementations, a first return valve is closed or remains closed and a second return valve is opened or remains open.

In at least some implementations, a first return valve is opened or remains open and a second return valve is closed or remains closed. In at least some implementations, a first return valve is closed or remains closed and a second return valve is closed or remains closed.

In at least some implementations, a system of a vehicle for controlling an electro-hydraulic brake system includes a controller that includes one or more processors, memory and instructions or programs stored in the memory or otherwise accessible by the processors that is capable of communicating with one or more sensors and one or more brake system components. The controller is capable of determining an expected pressure in the brake system, determining an actual pressure in the brake system, and preventing communication between a brake booster and a first brake assembly and permitting communication between the brake booster and a second brake assembly when the actual pressure is less than the expected pressure by more than a threshold.

In at least some implementations, the controller determines a subsequent actual pressure in the brake system, permits communication between the brake booster and the first brake assembly, and prevents communication between the brake booster and the second brake assembly when the subsequent actual pressure is less than the expected pressure by more than a threshold.

In at least some implementations, the controller determines a second subsequent actual pressure in the brake system, prevents communication between the brake booster and the first brake assembly, and prevents communication between the brake booster and a second brake assembly when the second subsequent actual pressure is less than the expected pressure by more than a threshold.

In at least some implementations, the first brake assembly is a right-front brake assembly and a left-front brake assembly, the second brake assembly is a right-rear brake assembly and a left-rear brake assembly.

In at least some implementations, the controller determines a subsequent actual pressure in the brake system, permits communication between the brake booster and the right-front brake assembly and the left-front brake assembly, and prevents communication between the brake booster and the right-rear brake assembly and the left-rear brake assembly when the subsequent actual pressure is less than the expected pressure by more than a threshold.

In at least some implementations, the controller determines a second subsequent actual pressure in the brake system, prevents communication between the brake booster and the right-front brake assembly, the left-front brake assembly, the right-rear brake assembly, and the left-rear brake assembly when the second subsequent actual pressure is less than the expected pressure by more than a threshold.

In at least some implementations, a first return valve is closed or remains closed and a second return valve is opened or remains open.

In at least some implementations, a first return valve is opened or remains open and a second return valve is closed or remains closed.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
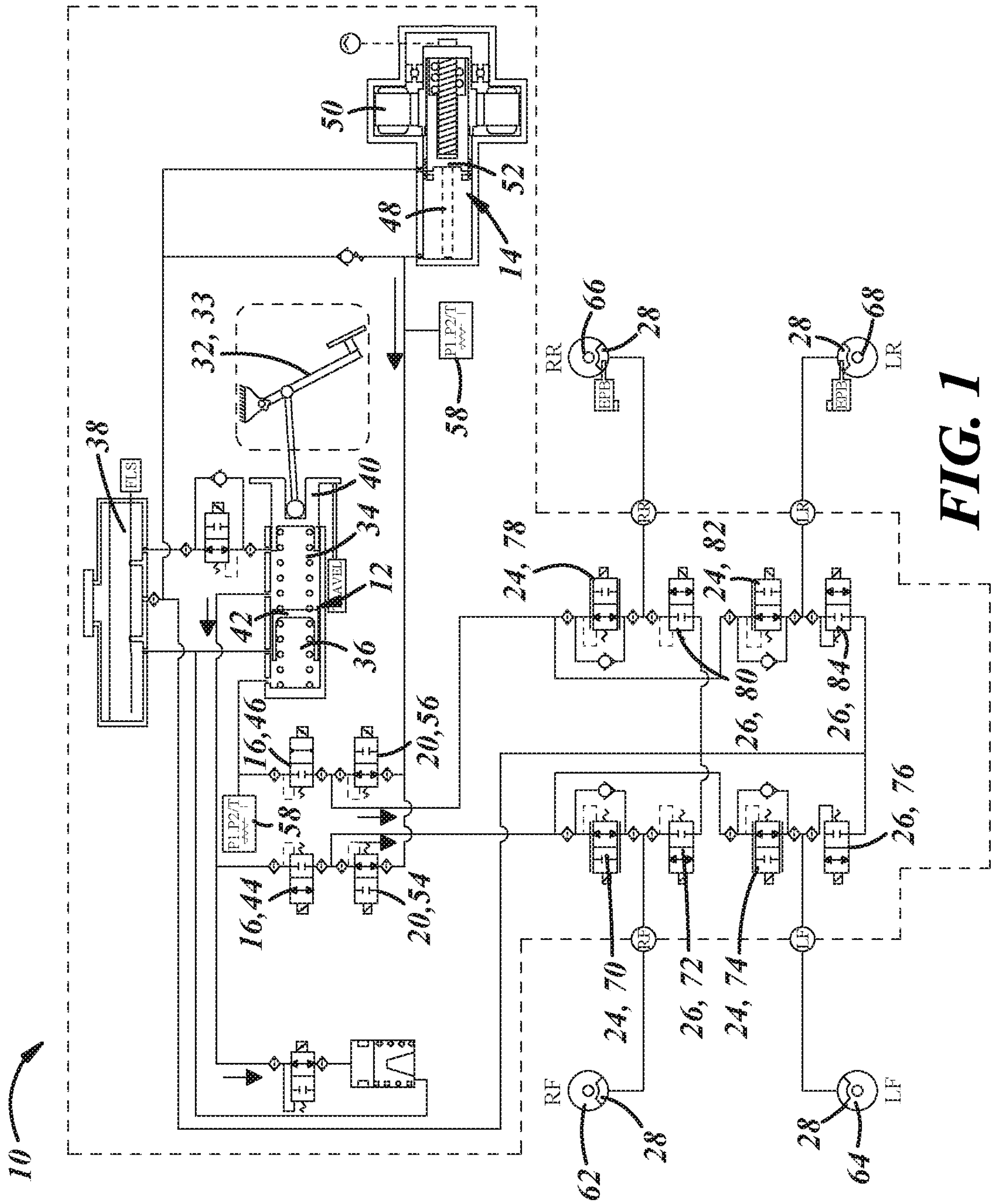
FIG. 1 is a schematic view of an electro-hydraulic brake system.

Referring in more detail to the drawings, FIG. 1 shows an electro-hydraulic brake system 10 for slowing and stopping a vehicle. The brake system includes a master cylinder 12, a brake booster 14, master cylinder valves 16, brake booster valves 20, actuator valves 24, return valves 26, brake assemblies 28, and a controller 30. The master cylinder 12 provides a first output or braking force to actuate the brake assemblies 28, and the brake booster 14 provides an increase in braking force to increase the stopping power of the brake system 10 in response to a given input brake force, such as is provided by a user actuating a brake pedal or other brake input 32.

The brake input 32 may be a mechanical component positioned within the vehicle (e.g. a foot actuated brake pedal) and movement of the brake input 32 is monitored by a brake input position sensor 33. The brake input position sensor 33 is capable of communicating with other brake system components to relay the real-time position of the brake input 32 to provide an indication of a user-intended braking force. While a user-actuated brake input 32 is shown, the brake input 32 may be defined by a signal from a vehicle control system, such as in a system in which vehicle speed is autonomously controlled, to actuate one or both of the master cylinder 12 and the brake booster 14 and provide a desired braking force.

The master cylinder 12 is a pressure vessel configured to house brake fluid divided into a first chamber 34 and a second chamber 36. The first chamber 34 and the second chamber 36 each have inlets through which fluid from a reservoir 38 is received into the master cylinder chambers 34, 36 and outlets through which fluid is discharged from the master cylinder chambers 34, 36. The first chamber 34 is defined in part by a first piston 40, and the second chamber 36 is defined in part by a second piston 42. Movement of the pistons 40, 42 changes the volume of the first chamber 34 and the second chamber 36, and fluid is taken into or discharged from the chambers 34, 36 as a function of the movement of the pistons 40, 42. The first piston 40 is coupled to the brake input 32 so that when a user actuates the brake input 32 the first piston 40 decreases the volume of the first chamber 34 which increases the pressure within a corresponding portion of the brake system 10. The second piston 42 may be driven by movement of the first piston 40 and likewise decreases the size of the second chamber 36 when the brake input 32 is actuated to increase the pressure within a corresponding portion of the brake system 10.

A first master cylinder valve 44 is in fluid communication with the first chamber 34, and brake fluid discharged from the first chamber 34 causes brake fluid pressure increase at the first master cylinder valve 44. The first master cylinder valve 44 has an inlet, an outlet, and a valve element configured to selectively control the flow and or pressure of brake fluid from the inlet through the outlet. A second master cylinder valve 46 is in fluid communication with the second chamber 36. The second master cylinder valve 46 has an inlet, an outlet, and a valve element configured to selectively control the pressure of brake fluid from the inlet through the outlet.

To increase the pressure applied in the system 10 for a given force applied to the brake input 32, the brake booster 14 is provided. The brake booster 14 is a pressure vessel having a booster chamber 48 with an inlet and an outlet through which brake fluid is discharged under pressure. The brake booster 14 includes an actuator 50. The actuator 50 drives a booster piston 52 to selectively change the volume of the booster chamber 48 to increase or decrease the pressure of the brake system 10. The actuator 50 may be a linear actuator and include an electric motor and a drive member driven by the electric motor. Non-limiting examples of the drive member, include a ball-screw or other linear actuator that drives a piston, or a belt or chain driven pump.

The outlet of the brake booster 14 is in fluid communication with a first brake booster valve 54 and a second brake booster valve 56. The first brake booster valve 54 has an inlet, an outlet, and a valve element configured to selectively control the flow of brake fluid from the inlet through the outlet. The second brake booster valve 56 has an inlet, an outlet, and a valve element configured to selectively control the flow of brake fluid from the inlet through the outlet.

The outlet of the first master cylinder valve 44, the outlet of the second master cylinder valve 46, the outlet of the first brake booster valve 54, and the outlet of the second brake booster valve 56 are in fluid communication through suitable brake lines with one or more of the brake assemblies 28. Each brake assembly 28 may include an actuator, a friction element, such as a brake pad or brake shoe, driven by the actuator relative to a vehicle wheel to frictionally engage part of the wheel and slow or stop the rotation of the wheel. The actuator is driven by increased pressure in the brake system 10 provided by one or both of the master cylinder 12 and the brake booster 14. An actuator valve 24 may be positioned between each brake assembly 28 and the outlets of either the first master cylinder valve 44 and the first brake booster valve 54 or the second master cylinder valve 46 and the second brake booster valve 56. The actuator valves 24 have an inlet, an outlet, and a valve element configured to selectively control the flow of brake fluid from the inlet through the outlet. A return valve 26 may be positioned between each brake assembly 28 and the inlet of the brake booster 14. The return valves 26 have an inlet, an outlet, and a valve element configured to selectively control the flow pressure of brake fluid from the inlet through the outlet. One or more pressure sensors 58 capable of determining the pressure within one or more brake lines may be positioned between the master cylinder 12 and the brake assemblies 28 and/or the brake booster 14 and the brake assemblies 28. The pressure sensor(s) 58 may communicate the current pressure within the brake system 10, or a part thereof, to a controller 30. In other implementations, additional pressure sensors 58 may be located beyond the first master cylinder valve 44, the second master cylinder valve 46, the first brake booster valve 54, and the second brake booster valve 56. The additional pressure sensors 58 may be utilized by the controller 30 to monitor the pressure of brake system 10 beyond the master cylinder valves 16 and or the brake booster valves 20 both before and after the valve elements are closed.

Figure 2:
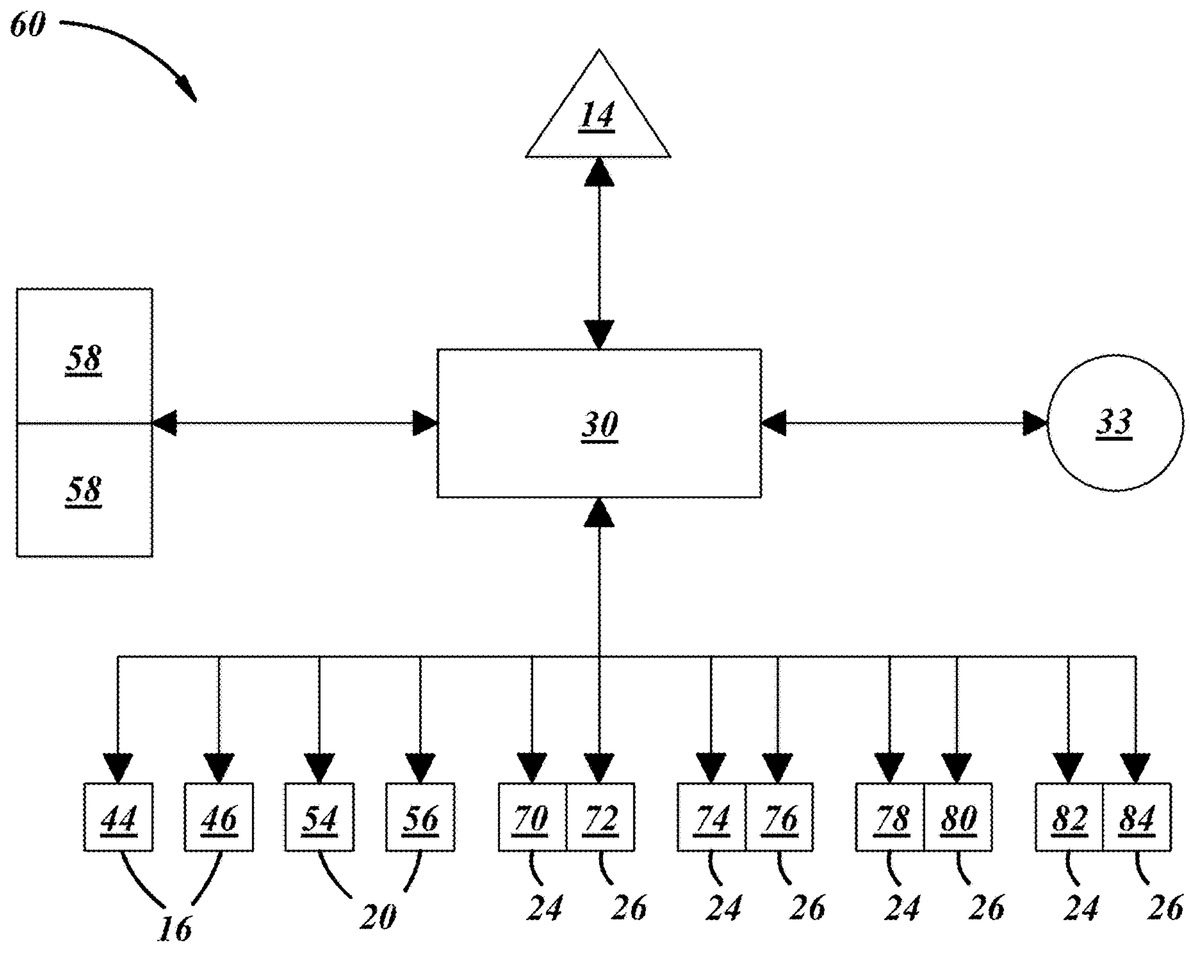
FIG. 2 is a schematic view of a controller system of the electro-hydraulic brake system.

The system controller 30 is, or is part of a control system 60 having one or more processors, memory and instructions or programs stored in the memory or otherwise accessible by the processors. As shown in FIG. 2, the controller 30 is communicated with the pressure sensor(s) 58 to obtain output indicative of the real-time pressure within the brake system 10, and with the brake input position sensor to obtain the real-time position of the brake input 32. Furthermore, the controller 30 is communicated with the first master cylinder valve 44, the second master cylinder valve 46, the first brake booster valve 54, the second brake booster valve 56, the actuator valve(s) 24, and the return valve(s) 26 such that the controller 30 can toggle each valve's valve element between open and closed positions to selectively control the flow of fluid through each valve. Additionally, the controller 30 is in communication with the brake booster 14 such that the controller 30 can drive the actuator 50 to increase or decrease the pressure output from the brake booster 14. Based on data from the brake input position sensor, the controller 30 can estimate or determine the expected or desired braking force and can then control the pressure of the brake system 10 to achieve the expected or desired braking force.

In an embodiment shown in FIG. 1, the vehicle may include four brake assemblies 28 each associated with a separate one of four wheels of the vehicle. That is, a right-front brake assembly 62 is associated with a right-front wheel of the vehicle, a left-front brake assembly 64 is associated with a left-front wheel, a right-rear brake assembly 66 is associated with a right-rear wheel of the vehicle, and a left-rear brake assembly 68 is associated with a left-rear wheel. The brake assemblies 28 may be in communication with one or more master cylinder valves 16 or brake booster control valves 20. For example, the right-front brake assembly 62 and the left-front brake assembly 64 may be in a first subcircuit and in communication with the first master cylinder valve 44 and the first brake booster valve 54. Within the first subcircuit, the right-front brake assembly 62 may be in communication with a first actuator valve 70 and a first return valve 72 and the left-front brake assembly 64 may be in communication with a second actuator valve 74 and second return valve 76. The left-rear brake assembly 68 and the right-rear brake assembly 66 may be in a second subcircuit and in communication with the second master cylinder valve 46 and the second brake booster valve 56. Within the second subcircuit, the right-rear brake assembly 66 may be in communication with a third actuator valve 78 and a third return valve 80 and the left-rear brake assembly 68 may be in communication with a fourth actuator valve 82 and a fourth return valve 84. However, other embodiments may contain more or fewer brake assemblies 28 oriented in different positions within the brake system 10 and the vehicle and may be configured to be in communication with different configurations of valves.

In normal operation of the brake system 10, the brake input 32 actuates the master cylinder pistons 42, 44 to increase pressure in the first chamber 34 and the second chamber 36 of the master cylinder 12. Thus, increasing the pressure of the system through the first master cylinder valve 44 and the second master cylinder valve 46 to the brake system 10. Based on data from the brake input sensor, the controller 30 activates the brake booster 14, which increases pressure through the first brake booster valve 54 and the second brake booster valve 56 to the brake system 10. Pressure from the first master cylinder valve 44 and the first brake booster valve 54 continues through the first subcircuit to actuate the friction elements of the right-front brake assembly 62 and the left-front brake assembly 64, slowing or stopping rotation of the right-front wheel or the left-front wheel. Pressure from the second master cylinder valve 46 and the second brake booster valve 56 continues through the second subcircuit actuate the friction elements of the right-rear brake assembly 66 and the left-rear brake assembly 68, slowing or stopping rotation of the right-rear wheel or the left-rear wheel.

When the brake input 32 is reduced, the position of the master cylinder pistons 40, 42 return to its pre-actuation position, decreasing the pressure within the first chamber 34 and the second chamber 36 of the master cylinder 12. Pressure through the first master cylinder valve 44 and the second master cylinder valve 46 are reduced. Based on data from the brake input sensor 33, the controller 30 reduces the pressure of the brake booster 14, reducing the pressure through the first brake booster valve 54 and the second brake booster valve 56 to the brake system 10. The reduction of pressure from the first master cylinder valve 44 and the first brake booster valve 54 continues through the first subcircuit to reduce actuation of the friction elements of the right-front brake assembly 62 and the left-front brake assembly 64, to permit rotation of the right-front wheel or the left-front wheel. The reduction of pressure from the second master cylinder valve 46 and the second brake booster valve 56 continues through the second subcircuit to reduce actuation of the friction elements of the right-rear brake assembly 66 and the left-rear brake assembly 68, to permit rotation of the right-rear wheel or the left-rear wheel.

Within the brake system 10, if a brake line, valve, or other brake fluid containing component leaks or fails, fluid pressure and braking force within at least a portion of the brake system 10 may be decreased or completely lost. However, if the portion of the brake system 10 that includes the leak is isolated from the rest of the brake system 10, the remaining, intact portion of the brake system 10 can be used to provide braking force for the vehicle, although the total braking force applied to certain wheels may be reduced.

Figure 3:
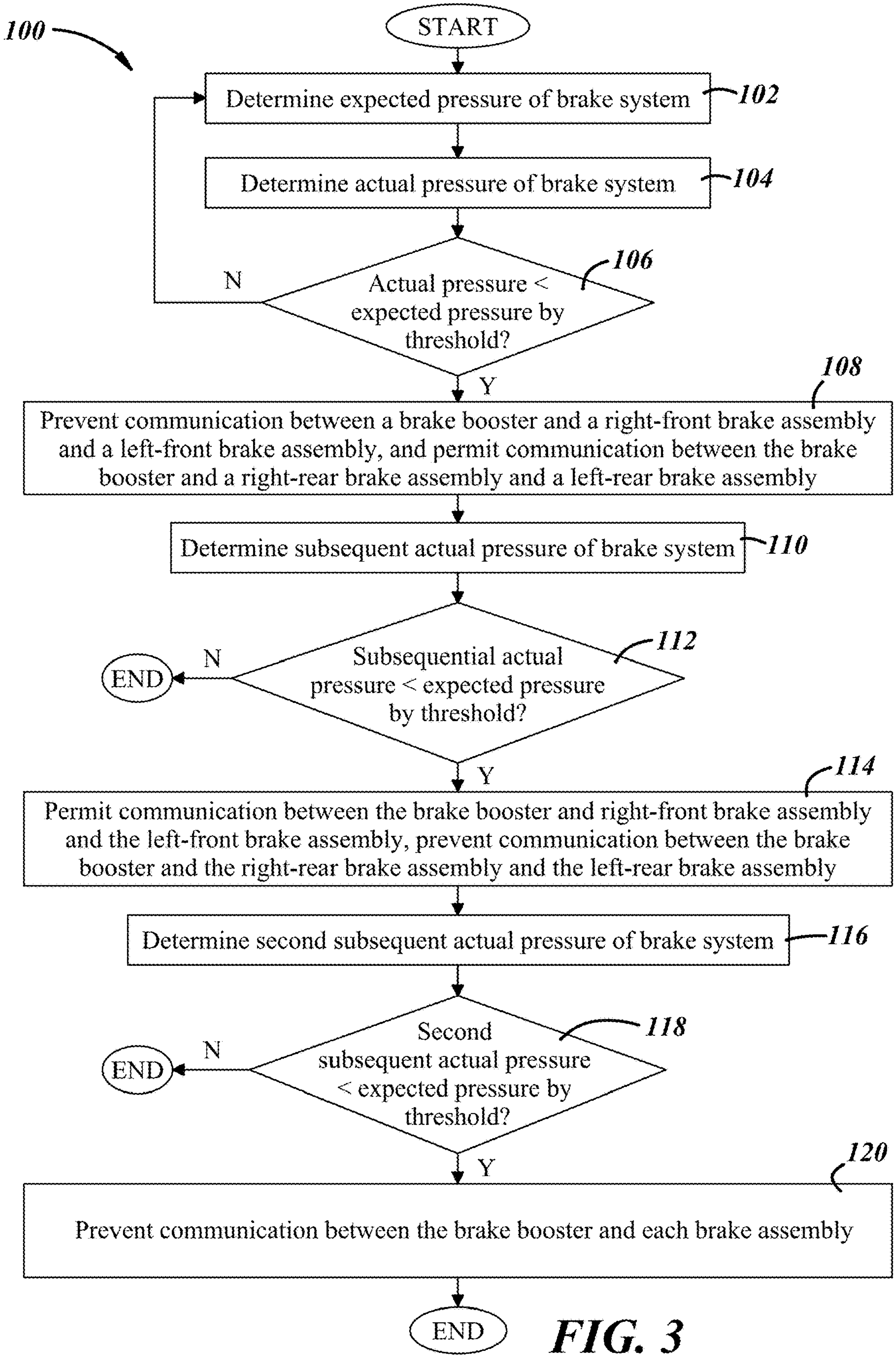
FIG. 3 shows a first flow chart for a method for controlling an electro-hydraulic brake system.

FIG. 3 depicts a method 100 for controlling the electro-hydraulic brake system 100. In some embodiments, as shown in FIG. 3, a brake system 10 has a first valve, which may be the first brake booster valve 54, in communication with one or more brake assemblies 28 and a second valve, which may be the second brake booster valve 56, in communication with one or more brake assemblies 28. The first brake booster valve 54 and the second brake booster control valve 56 may be in communication with different brake assemblies of the one or more brake assemblies 28. First, in step 102, utilizing the brake input position sensor 33, the controller 30 determines the expected pressure in the brake system 10. This may be determined as a function of the force applied to the brake input 32, the position of the brake input 32 and/or a rate of movement of the brake input 32. Next, in step 104, the controller 30 determines the actual pressure in one or more portions of the brake system 10. This can be done with one or more pressure sensors 58 located within the brake system 10 in communication with the brake booster 14 and at least one brake assembly 28 and/or with the master cylinder 12 and at least one brake assembly 28.

In step 106 the controller 30 then compares the expected pressure to the actual pressure to determine if the actual pressure is less than the expected pressure by more than a threshold, which may indicate a leak or other failure in part of the brake system 10. If the actual pressure is not less than the expected pressure by the threshold or more, then the brake system 10 proceeds with normal operation. However, when the actual pressure is less than the expected pressure by the threshold or more, the method proceeds to step 108. In step 108, the controller 30 closes the first brake booster valve 54 to prevent communication between the brake booster 14 and the right-front brake assembly 62 and the left-front brake assembly 64. The second brake booster valve 56 remains open or is opened to permit communication between the brake booster 14 and the right-rear brake assembly 66 and the left-rear brake assembly 68.

The brake system 10 may include one or more return valves 26. The one or more return valves 26 may be a first return valve 72, a second return, such as the third return valve 80, and/or the fourth return valve 84. The first return valve 72 is in communication with the brake booster 14 and the right-front brake assembly 62. The second return valve 76 is in communication with the brake booster 14 and the left-front brake assembly 64. The third return valve 80 is in communication with the brake booster 14 and the right-rear brake assembly 66. The fourth return valve 84 is in communication with the brake booster 14 and the left-rear brake assembly 68. When, in step 106, it is determined that the actual pressure is less than the expected pressure by more than the threshold, the first return valve 72 is closed to prevent communication between the brake booster 14 and the right-front brake assembly 62. The second return valve 76 is closed to prevent communication between the brake booster 14 and the left-front brake assembly 64. Thus, isolating the first subcircuit from the brake booster 14.

As shown in FIG. 3, the method 100 may then continue to step 110 in which a subsequent actual pressure in the brake system 10 is determined, as in step 102, and the subsequent actual pressure is compared to the expected pressure in step 112. If, in step 112 it is determined that the subsequent actual pressure is within a threshold of the expected pressure, then it is assumed that the portion of the brake system 10 with the leak/failure has been isolated from the rest of the brake system 10 by closure of the first brake booster valve 54 and/or the first return valve 72 and the second return valve 76 so that the second subcircuit of the brake system 10 can then retain pressure from the brake booster 14 and continue to provide braking force. However, both the first subcircuit and the second subcircuit may retain pressure from the master cylinder 12 to provide braking force to all four wheels. In this case, further action is not needed, and the method 100 may then end.

When, in step 112, it is determined that the subsequent actual pressure in the brake system is not within the threshold of the expected pressure, the method 100 proceeds to step 114. In step 114, the first brake booster valve 54 is opened to permit communication between the brake booster 14 and the at least one brake assembly 28 and the second brake booster valve 56 is closed to prevent communication between the brake booster 14 and the at least one other brake assembly 28. The first return valve 72 and the second return valve 76 may be opened to permit communication between the brake booster 14 and the first subcircuit, while the third return valve 80 and the fourth return valve 84 may be closed to prevent communication between the brake booster 14 and the second subcircuit. Because the subsequent actual pressure was not within a threshold of the expected pressure, the leaky or failed portion of the brake system 10 is assumed to be downstream of the second brake booster valve 56. Therefore, by closing the second brake booster valve 56 and/or the third return valve 80 and the fourth return valve 84, any pressure and/or brake fluid flow to the failed portion of the brake system 10 is terminated, and the first subcircuit of the brake system 10 can be operated normally to provide pressure from the brake booster 14 to the right-rear brake assembly 66 and the left-rear brake assembly 68 and provide a braking force to slow the speed of the vehicle. Both the first subcircuit and the second subcircuit may retain pressure from the master cylinder 12 to provide braking force to all four wheels.

As shown in FIG. 3, the method 100 may continue to step 116. In step 116, a second subsequent actual pressure in the brake system 10 is determined as in steps 102 and 110, and the subsequent actual pressure is compared to the expected pressure in step 118. If the second subsequent actual pressure is less than the expected pressure by more than a threshold, the leak in the brake system 10 must be between the first brake booster valve 54 or the second brake booster valve 56 and the brake booster 14 or within the brake booster 14 itself. To safely stop the vehicle, in step 120, the first brake booster valve 54 and the second brake booster valve 56 are closed preventing communication between the brake booster 14 and both the first subcircuit and the second subcircuit. Even with the brake booster 14 being completely isolated from the first subcircuit and the second subcircuit, both the first subcircuit and the second subcircuit may retain pressure from the master cylinder 12 to provide braking force to all four wheels.

The systems 10, 60 and methods 100 enable isolation of a leaking brake system component, particularly in a subcircuit including the brake booster 14, from the remainder of the system 10 to reduce brake fluid loss. The system 10 continues to provide braking force from the master cylinder 12 and allows braking force from the brake booster 14 to be applied to one or more brake assemblies 28 to provide an increased or boosted braking force even when a brake fluid leak is determined to exist. The brake booster 14 can, in at least some implementations, provide greatly increased braking force, and maintaining some output from the brake booster 14 to one or more brake assemblies 28 can greatly improve braking performance of the vehicle. Further, when the leak is isolated, such as by the methods noted herein, the system 10 can be maintained in the desired configuration (e.g. with one or more valves closed to maintain the isolation) for continued use of the vehicle without continued loss of brake fluid. Thus, the vehicle can be operated in the indicated state for a longer period before it is serviced to fix the leak.

What is claimed is:

1. A method for controlling an electro-hydraulic brake system, the method comprising the steps of:

determining an expected pressure in the brake system;

determining an actual pressure in the brake system;

preventing communication between a brake booster and a first brake assembly and permitting communication between the brake booster and a second brake assembly when the actual pressure is less than the expected pressure by more than a threshold;

determining a subsequent actual pressure in the brake system; and permitting communication between the brake booster and the first brake assembly and preventing communication between the brake booster and the second brake assembly when the subsequent actual pressure is less than the expected pressure by more than a threshold.

2. The method of claim 1, further comprising the steps of:

determining a second subsequent actual pressure in the brake system;

preventing communication between the brake booster and the first brake assembly and preventing communication between the brake booster and a second brake assembly when the second subsequent actual pressure is less than the expected pressure by more than a threshold.

3. The method of claim 1, wherein the first brake assembly includes one or both of a right-front brake assembly and a left-front brake assembly, the second brake assembly includes one or both of a right-rear brake assembly and a left-rear brake assembly.

4. The method of claim 3, wherein when the subsequent actual pressure is less than the expected pressure by more than a threshold communication is permitted between the brake booster and the right-front brake assembly and the left-front brake assembly, and communication is prevented between the brake booster and the right-rear brake assembly and the left-rear brake assembly.

5. The method of claim 4, further comprising the steps of:

determining a second subsequent actual pressure in the brake system;

preventing communication between the brake booster and the right-front brake assembly, the left-front brake assembly, the right-rear brake assembly, and the left-rear brake assembly when the second subsequent actual pressure is less than the expected pressure by more than a threshold.

6. The method of claim 1, wherein communication between the brake booster and the first brake assembly is prevented by closing a first brake booster valve or by leaving the first brake booster valve closed, and communication between the brake booster and the second brake assembly is permitted by opening a second brake booster valve or by leaving the second brake booster valve open.

7. The method of claim 1, wherein communication between the brake booster and the first brake assembly is permitted by opening a first brake booster valve or by leaving the first brake booster valve open, and communication between the brake booster and the second brake assembly is prevented by closing a second brake booster valve or by leaving the second brake booster valve closed.

8. The method of claim 2, wherein communication between the brake booster and the first brake assembly is prevented by closing a first brake booster valve or by leaving the first brake booster valve closed, and communication between the brake booster and the second brake assembly is prevented by closing a second brake booster valve or by leaving the second brake booster valve closed.

9. The method of claim 6, wherein a first return valve is closed or remains closed and a second return valve is opened or remains open.

10. The method of claim 7, wherein a first return valve is opened or remains open and a second return valve is closed or remains closed.

11. The method of claim 8, wherein a first return valve is closed or remains closed and a second return valve is closed or remains closed.

12. A system of a vehicle for controlling an electro-hydraulic brake system, comprising:

a controller that includes one or more processors, memory and instructions or programs stored in the memory or otherwise accessible by the processors that is capable of communicating with one or more sensors and one or more brake system components to:

determine an expected pressure in the brake system;

determine an actual pressure in the brake system;

prevent communication between a brake booster and a first brake assembly and permit communication between the brake booster and a second brake assembly when the actual pressure is less than the expected pressure by more than a threshold; and determine a subsequent actual pressure in the brake system and permit communication between the brake booster and the first brake assembly and prevent communication between the brake booster and the second brake assembly when the subsequent actual pressure is less than the expected pressure by more than a threshold.

13. The system of claim 12, wherein the controller determines a second subsequent actual pressure in the brake system and prevents communication between the brake booster and the first brake assembly and prevents communication between the brake booster and a second brake assembly when the second subsequent actual pressure is less than the expected pressure by more than a threshold.

14. The system of claim 12, wherein the first brake assembly incudes one or both of a right-front brake assembly and a left-front brake assembly, the second brake assembly includes one or both of a right-rear brake assembly and a left-rear brake assembly.

15. The system of claim 12, wherein the controller determines a second subsequent actual pressure in the brake system and prevents communication between the brake booster and the right-front brake assembly, the left-front brake assembly, the right-rear brake assembly, and the left-rear brake assembly when the second subsequent actual pressure is less than the expected pressure by more than a threshold.

16. The system of claim 12, wherein, during the step of preventing communication between the brake booster and the first brake assembly and permitting communication between the brake booster and the second brake assembly, a first return valve is closed or remains closed and a second return valve is opened or remains open.

17. The system of claim 12, wherein, during the step including permitting communication between the brake booster and the first brake assembly and preventing communication between the brake booster and the second brake assembly, a first return valve is opened or remains open and a second return valve is closed or remains closed.

18. A method for controlling an electro-hydraulic brake system, the method comprising the steps of:

determining an expected pressure in the brake system as a function of an actuation of a brake input;

determining an actual pressure in the brake system;

preventing communication between a brake booster and a first brake assembly and permitting communication between the brake booster and a second brake assembly when the actual pressure is less than the expected pressure by more than a threshold, wherein the system includes a master cylinder and preventing communication between the brake booster and the first brake assembly does not prevent communication between the master cylinder and the first brake assembly.

19. The method of claim 18 further comprising the steps of:

determining a subsequent actual pressure in the brake system; and permitting communication between the brake booster and the first brake assembly and preventing communication between the brake booster and the second brake assembly when the subsequent actual pressure is less than the expected pressure by more than a threshold, wherein preventing communication between the brake booster and the second brake assembly does not prevent communication between the master cylinder and the second brake assembly.

20. The method of claim 18, further comprising the steps of:

determining a second subsequent actual pressure in the brake system;

preventing communication between the brake booster and the first brake assembly and preventing communication between the brake booster and a second brake assembly when the second subsequent actual pressure is less than the expected pressure by more than a threshold, wherein preventing communication between the brake booster and both the first brake assembly and the second brake assembly does not prevent communication between the master cylinder and the first brake assembly and the second brake assembly.

* * * * *